(12) United States Patent
Batra et al.

(10) Patent No.: US 8,310,901 B1
(45) Date of Patent: *Nov. 13, 2012

(54) METHOD AND SYSTEM FOR PROVIDING SEPARATE WRITE AND OPTICAL MODULES IN AN ENERGY ASSISTED MAGNETIC RECORDING DISK DRIVE

(75) Inventors: Sharat Batra, Fremont, CA (US); Adam F. Torabi, Pleasanton, CA (US); Matthew R. Gibbons, San Jose, CA (US); Yugang Wang, Milpitas, CA (US); Kroum S. Stoev, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 12/796,806

(22) Filed: Jun. 9, 2010

(51) Int. Cl.
*G11B 11/00* (2006.01)

(52) U.S. Cl. ................... 369/13.33; 369/112.27

(58) Field of Classification Search ........... 369/13.24, 369/13.02, 13.01, 112.27, 112.01, 13.33, 369/13.03; 360/125.4, 234.4, 125.31, 125.74
See application file for complete search history.

(56) References Cited

U.S. PATENT DOCUMENTS

| | | | |
|---|---|---|---|
| 6,674,594 B1 | 1/2004 | Wakabayashi et al. | |
| 6,714,370 B2 | 3/2004 | McDaniel et al. | |
| 6,944,101 B2 | 9/2005 | Johns et al. | |
| 6,944,112 B2 | 9/2005 | Challener | |
| 7,068,453 B2 | 6/2006 | Terris et al. | |
| 7,099,096 B2 | 8/2006 | Ueyanagi | |
| 7,106,935 B2 | 9/2006 | Challener | |
| 7,155,732 B2 | 12/2006 | Rausch et al. | |
| 7,215,629 B2 | 5/2007 | Eppler | |
| 7,268,973 B2 | 9/2007 | Lille et al. | |
| 7,272,079 B2 | 9/2007 | Challener | |
| 7,412,143 B2 | 8/2008 | Rottmayer et al. | |
| 7,440,660 B1 | 10/2008 | Jin et al. | |
| 7,603,480 B2 | 10/2009 | Imai et al. | |
| 7,643,248 B2 | 1/2010 | Sluzewski | |
| 7,864,635 B2 * | 1/2011 | Shimizu ................. | 369/13.02 |
| 8,023,225 B2 | 9/2011 | Shimazawa et al. | |
| 8,116,171 B1 * | 2/2012 | Lee ........................ | 369/13.01 |
| 8,125,856 B1 * | 2/2012 | Li et al. ................. | 369/13.01 |
| 8,164,855 B1 | 4/2012 | Gibbons et al. | |
| 2003/0128633 A1 | 7/2003 | Batra et al. | |
| 2003/0235121 A1 | 12/2003 | Eppler | |
| 2004/0081031 A1 | 4/2004 | Saga et al. | |

(Continued)

FOREIGN PATENT DOCUMENTS

WO 2004/107323 A1 12/2004

*Primary Examiner* — Ali Neyzari

(57) ABSTRACT

An energy assisted magnetic recording (EAMR) transducer coupled with a laser is described. The EAMR transducer has an air-bearing surface (ABS) residing near a media during use. The EAMR transducer includes optical and writer modules. The optical module includes a waveguide and a near field transducer (NFT). The waveguide directs the energy from the laser toward the ABS. The NFT focuses the energy onto the media. The optical and writer modules are physically separate such that no portion of the waveguide is interleaved with a magnetic portion of the writer module. The writer module includes a write pole and coil(s). The write pole includes a pole-tip portion for providing a magnetic field to the media and a yoke. The pole-tip portion has an ABS-facing surface, a sloped surface, and a NFT-facing surface therebetween. The sloped surface is at least twenty-five and not more than sixty-five degrees from the NFT-facing surface.

34 Claims, 4 Drawing Sheets

U.S. PATENT DOCUMENTS

| | | |
|---|---|---|
| 2005/0190682 A1 | 9/2005 | Gage et al. |
| 2006/0083116 A1 | 4/2006 | Rottmayer et al. |
| 2006/0133230 A1 | 6/2006 | Buechel et al. |
| 2006/0143635 A1 | 6/2006 | Liu et al. |
| 2006/0181798 A1 | 8/2006 | Higuchi |
| 2006/0187561 A1 | 8/2006 | Trunz et al. |
| 2007/0070824 A1 | 3/2007 | Nishida et al. |
| 2007/0139818 A1 | 6/2007 | Shimazawa et al. |
| 2007/0159718 A1 | 7/2007 | Kim et al. |
| 2007/0165495 A1 | 7/2007 | Lee et al. |
| 2007/0177302 A1 | 8/2007 | Shimazawa et al. |
| 2007/0230048 A1 | 10/2007 | Hasegawa |
| 2008/0013912 A1 | 1/2008 | Shukh et al. |
| 2008/0043360 A1 | 2/2008 | Shimazawa et al. |
| 2008/0089187 A1 | 4/2008 | Suh et al. |
| 2008/0144206 A1 | 6/2008 | Mryasov et al. |
| 2008/0180827 A1 | 7/2008 | Zhu et al. |
| 2008/0218891 A1 | 9/2008 | Gubbins et al. |
| 2008/0232225 A1 | 9/2008 | Cho et al. |
| 2009/0052092 A1 | 2/2009 | Zhou et al. |
| 2009/0073858 A1 | 3/2009 | Seigler et al. |

\* cited by examiner

METHOD AND SYSTEM FOR PROVIDING SEPARATE WRITE AND OPTICAL MODULES IN AN ENERGY ASSISTED MAGNETIC RECORDING DISK DRIVE

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes grating 32, a conventional waveguide 12 including a core 13 and cladding 11, conventional pole 30, and near-field transducer (NFT) 40. The conventional EAMR transducer 10 is shown with a laser spot 14 that is guided by the conventional waveguide 12 to the NFT 40 near the air-bearing surface (ABS). The NFT 40 focuses the light to magnetic recording media (not shown), such as a disk. Other components that may be part of the conventional EAMR transducer 10 are not shown.

In operation, light from the spot 14 is coupled to the conventional EAMR transducer 10 using the grating 32. The waveguide 12, which is shown as including a planar solid immersion mirror, cladding 11, and core 13; directs light from the gratings 32A and 32B to the NFT 40. In other conventional EAMR transducers, the conventional waveguide 12 could take other forms. The direction of travel of the light as directed by the conventional waveguide 12 can be seen by the arrows 18 and 20. The NFT 40 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. The trend in magnetic recording continues to higher recording densities. As a result, fabrication of magnetic and optical portions of the conventional transducer 10 may become increasingly complicated. Such complexity in processing is generally undesirable. Further, as the density increases, the size of the transitions being written decreases. The conventional EAMR transducer 10 may inadvertently overwrite transitions. Such inadvertent overwrites are generally undesirable.

Accordingly, what is needed is a system and method for improving performance and fabrication of an EAMR transducer.

BRIEF SUMMARY OF THE INVENTION

A method and system for providing an energy assisted magnetic recording (EAMR) transducer coupled with a laser are described. The EAMR transducer has an air-bearing surface (ABS) residing in proximity to a media during use. The method and system include providing an optical module and providing a writer module. The optical module includes a waveguide and a near field transducer (NFT) proximate to the ABS. The waveguide directs the energy from the laser toward the ABS. The NFT is optically coupled with the waveguide and focuses the energy onto the media. The optical and writer modules are physically separate such that no portion of the waveguide is interleaved with a magnetic portion of the writer module. The writer module includes a write pole and at least one coil. The write pole includes a pole-tip portion for providing a magnetic field to the media and a yoke coupled to the pole-tip portion. The pole-tip portion has an ABS-facing surface, a sloped surface, and a NFT-facing surface between the ABS-facing surface and the sloped surface. The sloped surface is sloped at an angle of at least twenty-five degrees and not more than sixty-five degrees with respect to the NFT-facing surface.

DETAILED DESCRIPTION OF THE PREFERRED EMBODIMENTS

Figure 1:
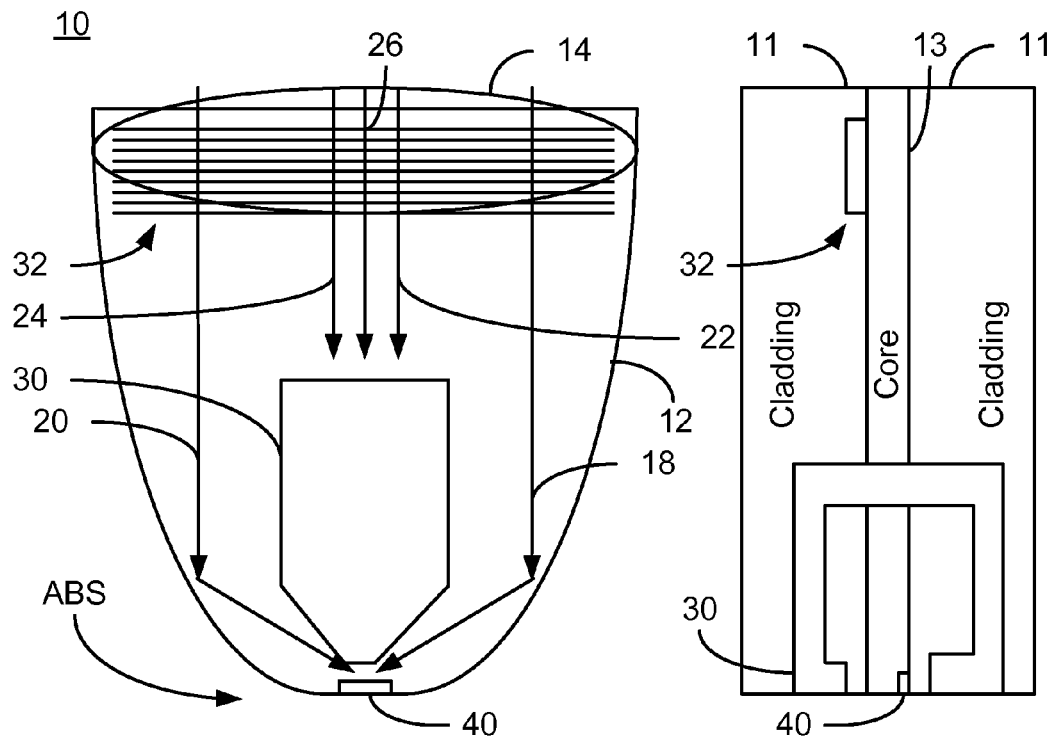
FIG. 1 depicts a side view of a conventional EAMR transducer.
Figure 2:
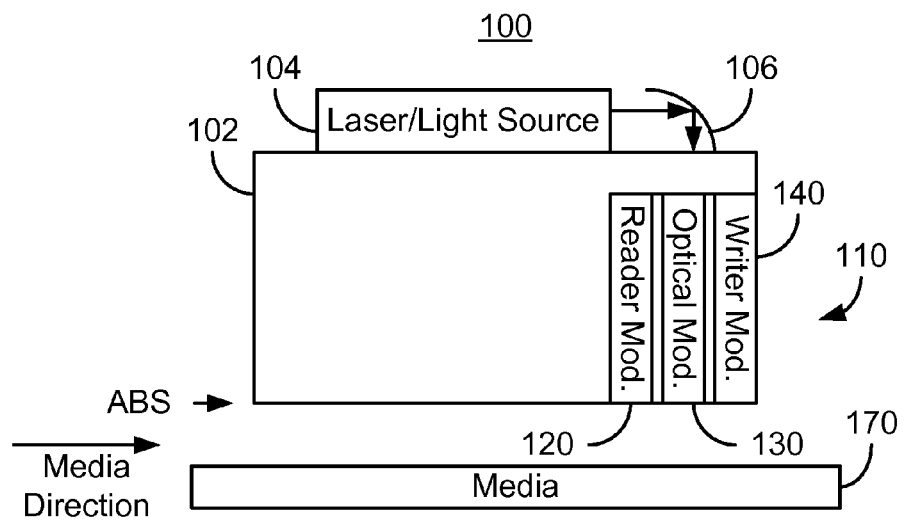
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104, a mirror or other optics 106 for redirecting light from the laser 104, an EAMR head 110, and media 170. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The media 170 may include multiple layers, which are not shown in FIG. 2 for simplicity. For example, the media 170 may include a magnetic layer for storing data, a heat sink layer, and/or a soft underlayer.

The EAMR head 110 includes an optional reader module 120, an optical module 130, and a writer module 140. The optical module 130 and writer module 140 may together form an EAMR write transducer. The reader module 120 may be included if the EAMR head 110 is a merged head. The optical module 130 is optically coupled to the laser 104, for example through a grating (not shown in FIG. 2). The optical module may also include a waveguide (not shown in FIG. 2) and NFT (not shown in FIG. 2) proximate to the ABS. The waveguide directs the energy from the laser 104 toward the ABS. In some embodiments, the waveguide might be a parabolic solid immersion mirror. The waveguide may also be a tapered waveguide. In some embodiments, the waveguide directs the light from the laser in a direction substantially perpendicular to the ABS and substantially without changing the direction of the light. The NFT is optically coupled with the waveguide and focuses the energy onto the media 170. In some embodiments, the reader module 120 and optical module 130 are physically separate such that no portion of the waveguide is interleaved with any magnetic portion of the reader module. Thus, as the waveguide is traversed in a direction perpendicular to the ABS no portion of the waveguide would not cross any magnetic portion of the reader module 120. In some embodiments, the optical module 130 is physically separated from the reader module 120. Thus, in such embodiments, as the optical module 130 is traversed in a direction perpendicular to the ABS, no portion of the optical module 130 crosses any portion of the reader module 120. This can be seen in FIG. 2, in which the reader module 120 and optical module 130 do not overlap in a direction perpendicular to the ABS.

The writer module 140 is magnetic in nature and is used to magnetically write to a region of the media 170 heated by the optical module 130. Thus, the writer module 140 may include pole(s) (not shown in FIG. 2), coil(s) (not shown in FIG. 2) shields (not shown in FIG. 2), and/or other components. The optical module 130 and writer module 140 are physically separate such that no portion of the waveguide is interleaved with the magnetic portions of the writer module 140. Thus, as the waveguide is traversed in a direction perpendicular to the ABS, the waveguide does not cross any magnetic portion of the writer module 140. In some embodiments, no portion of the waveguide is interleaved with the writer module any portion of the writer module 140. Further in some embodiments, no portion of the optical module is interleaved with any portion of the writer module 140. This can be seen in FIG. 2, in which the optical module 130 and writer module 140 do not overlap in a direction perpendicular to the ABS. Note that the modules 120, 130, and 140 are shown as being separated by small spaces. However, in other embodiments, one or more of the modules 120, 130, and 140 may adjoin another module 120, 130, and/or 140.

Because the optical module 130 and writer module 140 are physically separate, fabrication of the EAMR disk drive 100 may be facilitated. More specifically, the optical module 130 and writer module 140 may be individually fabricated and optimized without affecting the other module 140 or 130, respectively. For similar reasons, the reader module 120 being physically separate from the optical module 130 simplifies fabrication of the reader module 120 and optical module 130. Fabrication and integration of the EAMR disk drive 100 may have improved yield. Ease of manufacturing and integration may also be enhanced. Thus, the EMAR disk drive 100 may be suitable for use in higher density recording applications.

Figure 3:
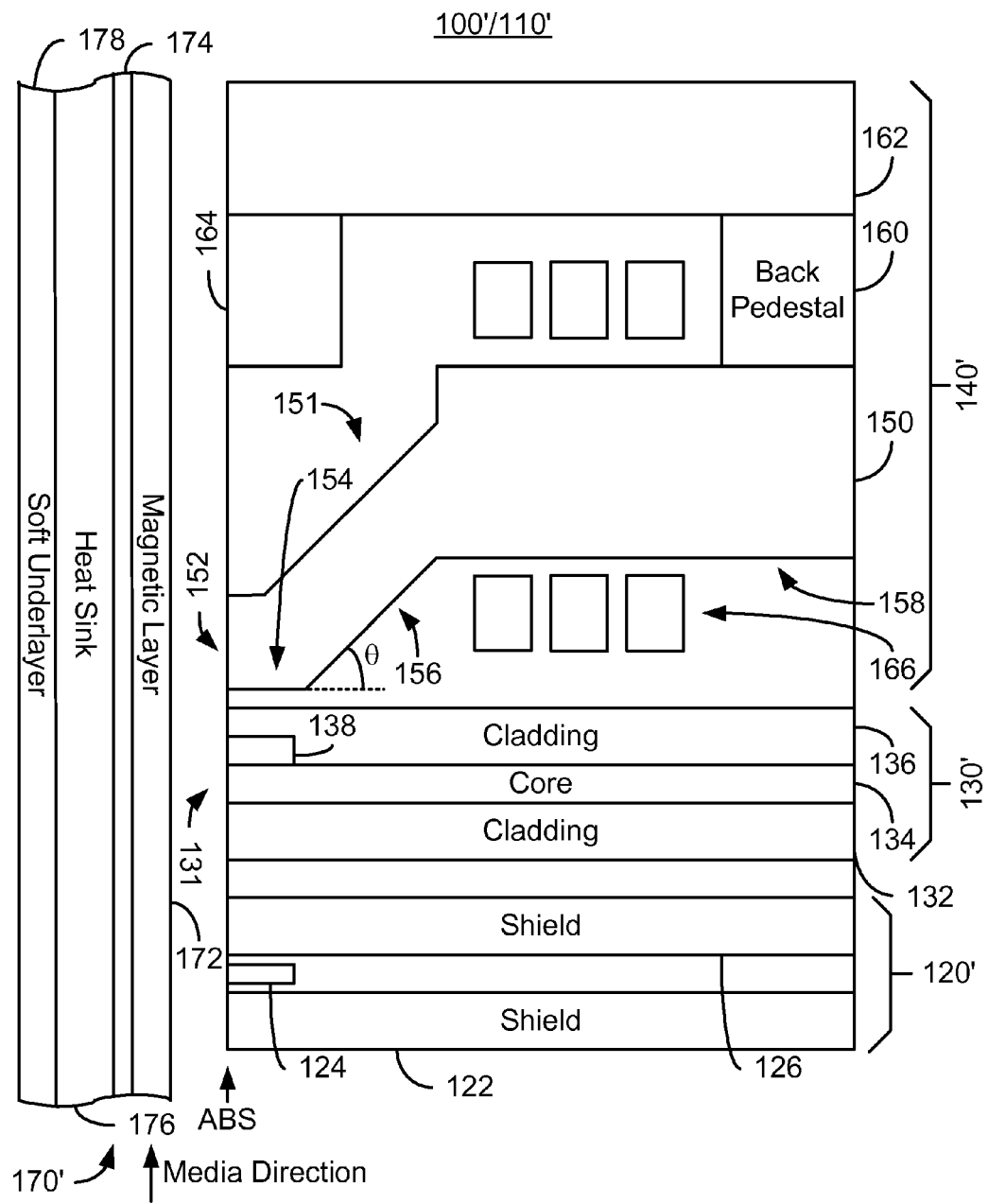
FIG. 3 depicts a side view of an exemplary embodiment of a portion of an EAMR disk drive.

FIG. 3 depicts a side view of an exemplary embodiment of a portion of an EAMR disk drive 100'/EAMR head 110'. For clarity, FIG. 3 is not to scale. For simplicity not all portions of the EAMR disk drive 100'/EAMR head 110' are shown. In addition, although the disk drive 100' is depicted in the context of particular components other and/or different components may be used. Further, the arrangement of components may vary in different embodiments. The EAMR disk drive 100'/EAMR head 110' is analogous to the EAMR disk drive 100/EAMR head 110. Consequently, similar components have analogous labels. The EAMR disk drive 100'/EAMR head 110' thus includes a reader module 120', an optical module 130' and a writer module 140'. Also shown is media 170'.

The media 170' includes multiple layers. In particular, the media 170' includes a soft underlayer 178. The media 170' also includes a magnetic layer 172, an interlayer 174, a heat sink layer 176, and the soft underlayer 178. As a result, the media 170' may have a high anisotropy media. Use of the heat sink layer 176 allows for fast cooling from the heat sink layer 176. This enhanced cooling improves thermal spot confinement. Further, the media 170' may have a high perpendicular anisotropy, which allows for a high linear density. The soft underlayer 178 may provide a flux return path. The soft underlayer 178 may have a relatively permeability of at least one hundred and saturation magnetization of at least one Tesla. Thus, the media 170' may be better able to support a higher recording density and smaller bit size.

The EAMR head 110' includes modules 120', 130', and 140'. The reader module 120' is optional. For example, the reader module 120' is included if the EAMR head 110' is a merged head. Reader module 120' includes shields 122 and 126 as well as read sensor 124. The read sensor 124 may be a giant magnetoresistance sensor, such as a tunneling magnetoresistance junction. However, in other embodiments, other read sensors may be used.

The optical module 130' receives light from a laser, such as a laser diode (not shown in FIG. 3). The optical module may be optically coupled to the laser through a grating which, for clarity, is not shown. The optical module 130' includes a waveguide 131 and an NFT 138. The waveguide 131 includes cladding 132 and 136 with a core 134 therebetween. The waveguide 131 may include at least one of a tapered waveguide and a parabolic solid immersion mirror. In the embodiment shown, the waveguide 131 directs light in a direction substantially perpendicular to the ABS. Stated differently, energy travels in the general direction from the right side of the page distal from the ABS toward the NFT 138 proximate to the ABS. The NFT 138 is optically coupled with the waveguide 131 and focuses the energy onto the media 170'.

The writer module 140' includes a write pole 150 and coils 166. In the embodiment shown, the coils 166 are solenoidal coils. However, in other embodiments, the coils 166 may be pancake coils or have another configuration. As in the disk drive 100, the writer module 140' and the optical module 130' are physically separate such that no portion of the waveguide 131 overlaps with a magnetic portion of the writer module 140'. Thus, when traversing the waveguide 131 in a direction perpendicular to the ABS (e.g. left to right in FIG. 3), the waveguide 131 does not cross any magnetic portion of the writer module 104', such as the pole 150, the back pedestal 160, the return pole 162, and the return pole pedestal 164. In some embodiments, no portion of the optical module 130' overlaps with the writer module 140'. Such an embodiment is shown in FIG. 3. The modules 120', 130', and 140' are shown as being separated by small spaces. However, in other embodiments, one or more of the modules 120', 130', and 140' may adjoin another module 120', 130', and/or 140'.

The write pole 150 includes a pole-tip portion 151 and a yoke portion 158. The pole-tip portion 151 is proximate to the ABS, while the yoke 158 is distal from the ABS. The pole-tip portion 151 provides a magnetic field to the media 170 during writing. The pole-tip portion 151 includes an ABS-facing surface 152, a NFT-facing surface 154, and a sloped surface 156. As can be seen in FIG. 3, the sloped surface 156 is sloped at an angle, $\theta$, with respect to the NFT-facing surface 154. In some embodiments, the angle is at least twenty-five degrees and not more than sixty-five degrees with respect to the NFT-facing surface 154. In some embodiments, the angle is at least forty degrees and not more than fifty degrees.

The NFT-facing surface 154 is between the ABS-facing surface 152 and the sloped surface 156. In addition, the NFT-facing surface may be parallel to the NFT 138. Consequently, the spacing between the NFT 138 and the pole-tip region 151 is small and controlled. In some embodiments, the NFT facing surface is at least ten and not more than fifty nanometers from the NFT. In other embodiments the NFT-facing surface 154 may be closer to the NFT 138 than ten nanometers. For example, in some embodiments, the NFT-facing surface 154 may contact the NFT 138. Although shown as extending past the NFT 138 in a direction perpendicular to the ABS, the NFT-facing surface 154 may terminate closer to the ABS. In some embodiments, the NFT-facing surface 154 extends not more than two hundred nanometers from the ABS. In some such embodiments, the NFT-facing surface extends not more than one hundred nanometers from the ABS. In some embodiments, the NFT-facing surface 154 extends at least twenty nanometers from the ABS. However, in other embodiments, the NFT-facing surface 154 may extend a smaller distance from the ABS. For example, in some embodiments, the distance the NFT-facing surface 154 extends from the ABS may approach zero.

In addition to the write pole 150, the writer module 140' includes a back pedestal 160 and return pole 162 having pedestal 164. In other embodiments, the return pole 162 may not include pedestal 164. The write pole 150 is between the optical module 130' and the return pole 162. More specifically, the pole-tip portion 151 resides between the NFT 138 and the return pole 164.

Although not specifically depicted in FIG. 3, the pole 150 may have other features. For example, the magnetic moment of the pole 150 may vary. In such embodiments, at least the pole-tip portion 151 of the pole 150 may have a graded moment. In some embodiments, the pole tip region 151 has a moment that is highest closer to the NFT 138 and decreases with increasing distance from the NFT 138. However, in other embodiments, the moment may vary in a different manner. In addition, the bottom (leading edge) of the pole-tip region 151, closer to the NFT 138 may be smaller than the top (trailing edge) of the pole-tip region 151 in the track width direction (perpendicular to the plane of the page in FIG. 3). Stated differently, the width of the pole 150 proximate to the ABS in the track-width direction may increase with increasing distance from the NFT 138. As a result, the magnetic field generated by the pole 150 and used to write to the media 170' may be more concentrated in proximity to the NFT 138. The magnetic field may also fall off more rapidly further from the NFT 138. Consequently, the trailing edge of the pole 150 may have a lower field. As a result, the trailing edge of the pole 150 may be less likely to overwrite a bit written at the leading edge of the pole 150.

The pole-tip region 151 may also include a nose and a flared region. The nose region extends from the ABS to the front edge of the sloped surface 156. In the embodiment shown, the front edge of the sloped surface 156 corresponds to the location at which the NFT-facing surface 154 meets the sloped surface 156. The throat height corresponds to the distance between the ABS and the front of the sloped surface 156. The flared region corresponds to a region at which the pole 150 changes dimension in a direction perpendicular to the plane of the page. The nose meets the flared region at a flare point. In some embodiments, the throat height is the same as the flare point. In some embodiments, this flare point is at least twenty and not more than two hundred nanometers from the ABS.

The EAMR disk drive 100' and EAMR head 110' may have improved fabrication and yield. As discussed above, separation of the modules 120', 130', and 140' of the EMR disk drive 100' may allow for improved fabrication and performance. Thus, the EAMR disk drive 100' may be adapted for higher magnetic recording density applications.

Other features of the EAMR head 110' may also improve performance of the EAMR head. For example, the sloped surface 156 allows for a balancing of optical and magnetic efficiencies. The sloped surface 156 has a sufficiently large angle, θ, that magnetic material is moved even further from the waveguide core 134. This is in addition to the modules 120', 130', and 140' being physically separate. Thus, optical efficiency may be improved. However, the angle θ is sufficiently small that enough magnetic field is provided to the media 170 in the region of the spot heated by the NFT 138 that the magnetic efficiency of the write pole 150 is not unduly sacrificed. As a result, the combination of the magnetic and optical efficiencies may be enhanced. Because the NFT-facing surface 154 is parallel to the NFT 138, the spacing between the NFT 138 and the pole-tip region 151 is small and controlled. Thus, a higher field may be achieved close to the NFT 138. The magnetic track width is determined by the region heated by NFT 138. Thus, the magnetic track width is determined by the NFT 138, rather than the width of the write pole 150. The pole-tip region 151 may thus have relaxed size and manufacturing tolerances. Similarly, the pedestal 164, which is coupled with the return pole 162, allows for magnetic material to be closer to the ABS. A magnetic field sufficient for writing may be provided at the media 170 in the location of the thermal spot developed by the NFT 138. The EAMR head 110' may, therefore, have improved magnetic performance as well as improved manufacturing. Further, use of the media 170' having a high perpendicular anisotropy, heat sink layer 176 and soft underlayer 178 may allow the media 170' to be adapted to higher recording densities.

Figure 4:
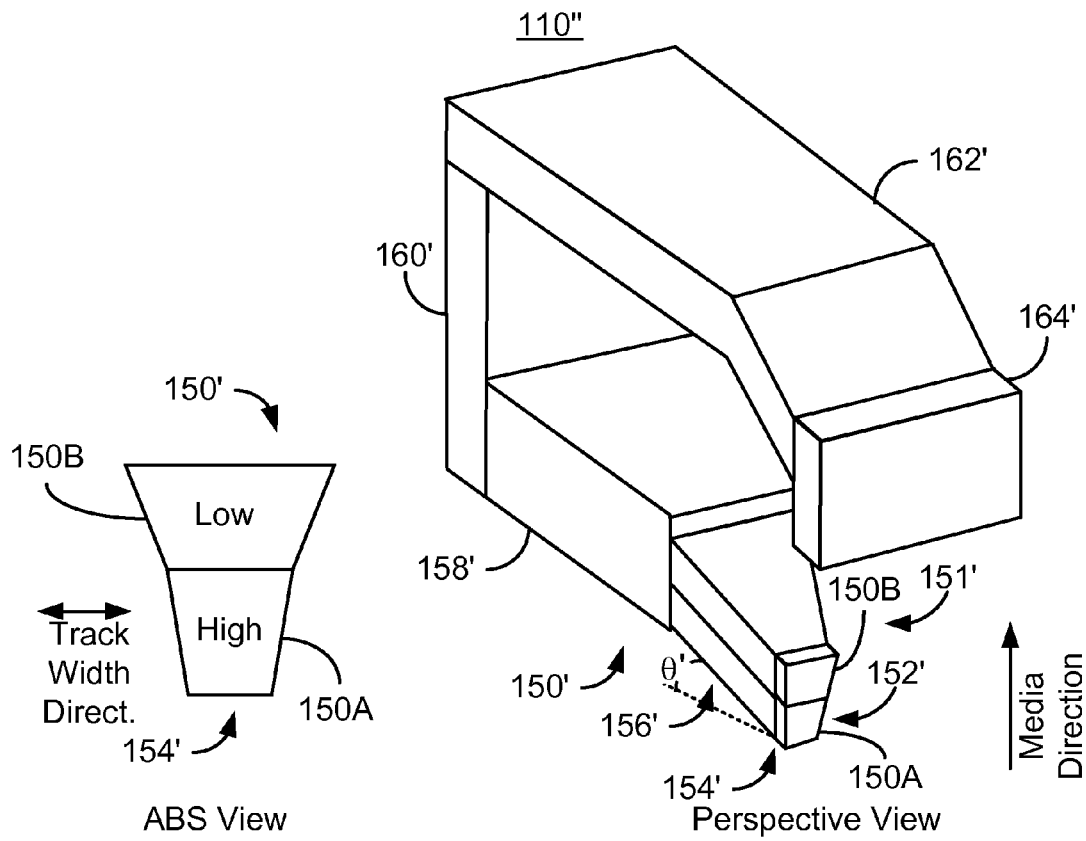
FIG. 4 depicts ABS and perspective views of an exemplary embodiment of a portion of an EAMR head.

As discussed above, the EAMR disk drive 100' may have a graded pole. FIG. 4 depicts ABS and perspective views of an exemplary embodiment of a portion of an EAMR head 110". For clarity, FIG. 4 is not to scale. The EAMR head 110" may be used in an EAMR disk drive, such as the EAMR disk drive 100 or 100'. For clarity, only a portion of the EAMR head 110" is shown. Although the EAMR head 110' is depicted in the context of particular components other and/or different components may be used. Further, the arrangement of components may vary in different embodiments. The EAMR head 110" is analogous to the EAMR heads 110 and 110'. Consequently, similar components have analogous labels. The EAMR disk drive 100'/EAMR head 110" thus includes poles 150' and 162', pole-tip region 151', yoke 158', return pole pedestal 164', and back pedestal 160' corresponding to poles 150 and 162, pole-tip region 151, yoke 158, return pole pedestal 164, and back pedestal 160, respectively. The ABS facing surface 152', NFT-facing surface 154', and sloped region 156' correspond to the ABS facing surface 152, NFT-facing surface 154, and sloped region 156.

The pole tip portion 151' includes a high moment layer 150A and a lower moment layer 150B. For example, the high moment layer 150A may have a saturation magnetization of greater than two Tesla and up to 2.4 Tesla or higher. The low moment layer 150B has a saturation magnetization that is less than that of the high moment layer and may be as low as one Tesla or less. In the embodiment shown in FIG. 4, the entire pole-tip region 151' has a high moment layer 150A proximate to the NFT 138/including the NFT-facing surface 154 and a low moment layer 150B further from the NFT 138. Although two layers 150A and 150B are shown, three or more layers might be used in another embodiment. Further, in some embodiments, the pole-tip region 151' may include an alloy having a varying moment in lieu of or in addition to distinct layers. In addition, the top (trailing edge) of the pole 150' is wider than the bottom (leading edge/NFT-facing surface 154') of the pole 150' in the track width direction. Thus, the low moment layer 150B is wider than the high moment layer 150A. Thus, the moment of the pole-tip region 151' decreases with increasing distance from the NFT-facing surface 154' while the width of the pole-tip region 151' proximate to the ABS increases with increasing distance from the NFT-facing surface 154'. In addition, the sloped surface 156' is sloped at an angle θ' with respect to the NFT-facing surface 154'. The angle θ' is analogous to the angle θ.

The pole 150' of the EAMR head 110' also has a nose and a flared region that meet at a flare point. In FIG. 4, the sloped surface 156' is part of the flared region. The width of the pole 150' in the track width direction increases through the flared region. The NFT-facing surface 254' meets the sloped surface at a throat height. The throat height is thus the distance from the ABS at which the pole 150' diverges from the NFT. In the embodiment shown in FIG. 4, the throat height is the same as the flare point. In some embodiments, the flare point is at least twenty and not more than two hundred nanometers from the ABS.

The pole 150' may share the benefits of the EAMR head 110'. The pole 150' increases in width and decreases in magnetic moment further from the NFT-facing surface 154'. These features may decrease the magnetic field at the trailing edge of the pole. The trailing edge field is thus less likely to affect previously written tracks that are either on track or on adjacent tracks at nonzero skew angles. Consequently, inadvertent writing over previously written tracks may be reduced. Performance of the EAMR head 110" may be further enhanced.

Figure 5:
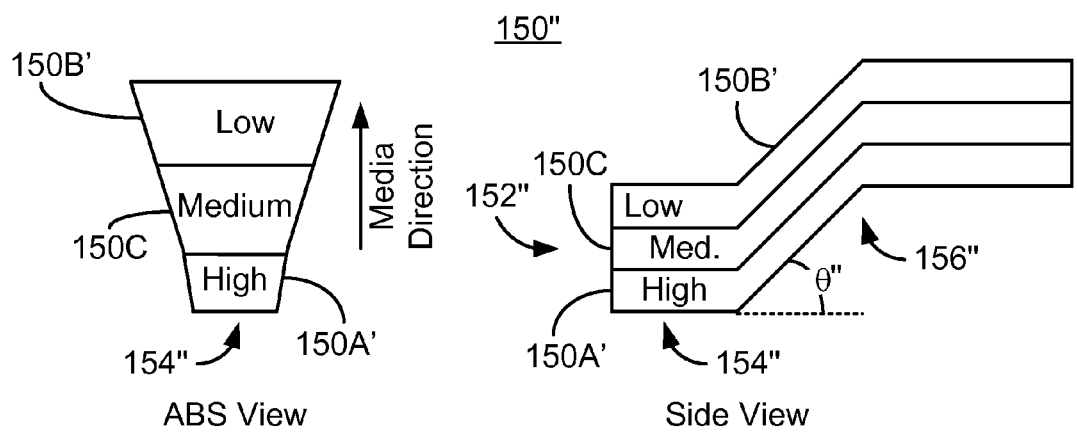
FIG. 5 depicts ABS and side views of another exemplary embodiment of a portion of an EAMR transducer.

FIG. 5 depicts ABS and side views of another exemplary embodiment of a portion of an EAMR transducer. More specifically, a portion of the pole 150" is shown. For clarity, FIG. 5 is not to scale. The pole 150" may be used in an EAMR disk drive, such as the EAMR disk drive 100 and/or 100', and/or an EAMR head, such as the EAMR head 110, 110', and/or 110". Although the pole 150" is depicted in the context of particular components other and/or different components may be used. Further, the arrangement of components may vary in different embodiments. The pole 150" is analogous to the poles 150 and 150'. Consequently, similar components have analogous labels. The pole 150" includes ABS facing surface 152", NFT-facing surface 154", and sloped region 156" correspond to the ABS facing surface 152/152', NFT-facing surface 154/154', and sloped region 156/156'.

The pole 150" has a top, or trailing edge that is wider than its bottom, or leading edge. The moment of the top layer 150B' is also lower than that of the bottom layers 150A'. In addition, another layer 150C is shown. The layer 150C has a moment that is between the moments of the layers 150A' and 150B'. Additional layers (not shown) having intermediate moments may also be used. Thus, the pole 150" shares the benefits of the poles 150 and 150'.

Figure 6:
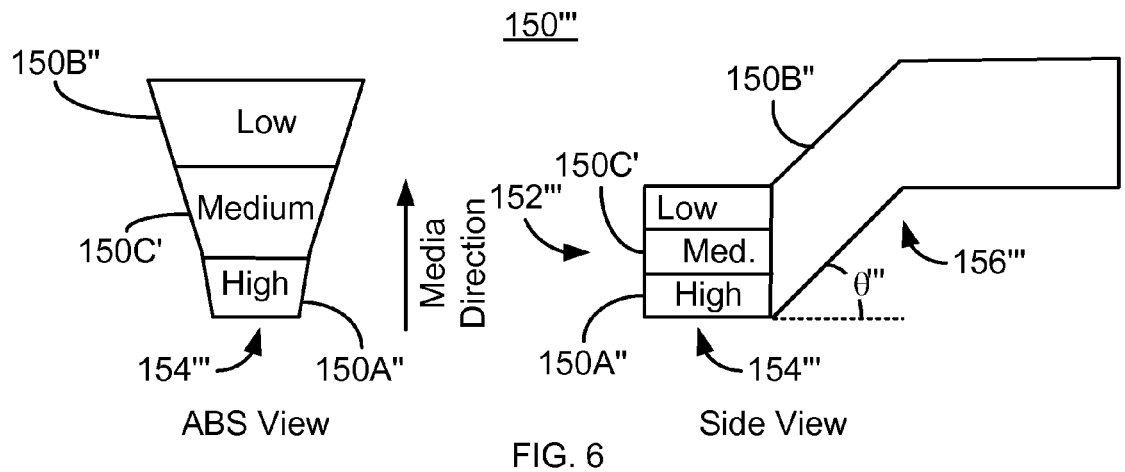
FIG. 6 depicts ABS and side views of another exemplary embodiment of a portion of an EAMR transducer.

FIG. 6 depicts ABS and side views of another exemplary embodiment of a portion of an EAMR transducer. More specifically, a portion of the pole 150''' is shown. For clarity, FIG. 6 is not to scale. The pole 150''' may be used in an EAMR disk drive, such as the EAMR disk drive 100 and/or 100', and/or an EAMR head, such as the EAMR head 110, 110', and/or 110". Although the pole 150''' is depicted in the context of particular components other and/or different components may be used. Further, the arrangement of components may vary in different embodiments. The pole 150''' is analogous to the poles 150, 150', and 150". Consequently, similar components have analogous labels. The pole 150''' includes ABS facing surface 152''', NFT-facing surface 154''', and sloped region 156''' correspond to the ABS facing surface 152/152'/152", NFT-facing surface 154/154'/154", and sloped region 156/156'/156".

The pole 150''' has a top, or trailing edge that is wider than its bottom, or leading edge. In addition, the pole 150''' includes layers 150A", 150B", and 150C", which are analogous to the layers 150A/150A', 150B/150B', and 150C, respectively. Additional layers (not shown) having intermediate moments may also be used. Thus, other portions of the pole 150''' may or may not have a varying magnetic moment. In the embodiment shown, the multiple layers 150A", 150B", and 150C''' are only used proximate to the NFT. However, the pole 150''' may still share the benefits of the poles 150 and 150'.

Figure 7:
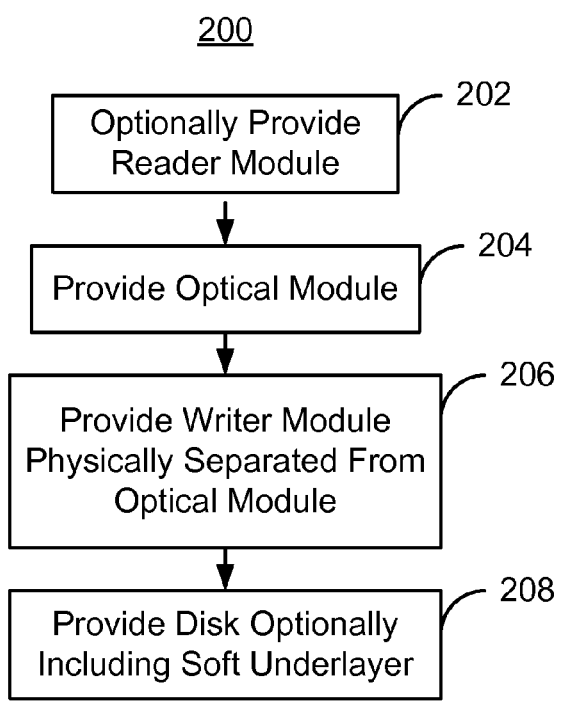
FIG. 7 depicts an exemplary embodiment of a method of forming a portion of an EAMR transducer.

FIG. 7 depicts an exemplary embodiment of a method 200 of forming a portion of an EAMR disk drive. For simplicity, some steps may be omitted, combined, and/or performed in another sequence. The method 200 is described in the context of the EAMR disk drive 100'. However, the method 200 may be used to fabricate other EAMR transducers. In addition, the method 200 is described in the context of fabricating a single disk drive 100'. However, multiple transducers may be fabricated substantially in parallel. Further, although described as separate steps, portions of the method 200 may be interleaved.

The reader module 120' is optionally provided, via step 202. Step 202 includes fabricating the components 122, 124, and 126 of the reader module 120'

An optical module 130' is provided, via step 204. Step 204 includes fabricating the waveguide 131 and a NFT 138 proximate to the ABS. The optical module 130' is also fabricated such that it is physically separate from the reader module 120' and the writer module 140'. Thus, only components of the optical module 130' are fabricated in step 204.

A writer module 140' is provided, via step 206. Step 206 includes fabricating the magnetic structures 150, 160, 162, and 164 as well as coils 166. The writer module 140' is also fabricated such that it is physically separate from the reader module 120' and the optical module 130'. Thus, only components of the writer module 140' are fabricated in step 206.

The media 170' is optionally fabricated and incorporated into the disk drive 110', via step 208. Thus, step 208 may include forming soft underlayer 178, heat sink layer 176, and magnetic layer 174 that may have a high perpendicular anisotropy. Fabrication of the EAMR disk drive 100' may then be completed. Thus, using the method 200, the benefits of the EAMR disk drive 100 and/or 100' may be achieved.

We claim:

1. An energy assisted magnetic recording (EAMR) head coupled with a laser for providing energy and having an air-bearing surface (ABS) configured to reside in proximity to a media during use, the EAMR head comprising:

an optical module including a waveguide and a near field transducer (NFT) proximate to the ABS, the waveguide for directing the energy from the laser toward the ABS, the NFT being optically coupled with the waveguide and for focusing the energy onto the media; and a writer module including a write pole and at least one coil, the optical module and the writer module being physically separate such that no portion of the waveguide is interleaved with a magnetic portion of the writer module, a write pole including a pole-tip portion for providing a magnetic field to the media and a yoke coupled to the pole-tip portion, the pole-tip portion including an ABS-facing surface, a sloped surface, and a NFT-facing surface between the ABS-facing surface and the sloped surface, the sloped surface being sloped at an angle of at least twenty-five degrees and not more than sixty-five degrees with respect to the NFT-facing surface.

2. The EAMR head of claim 1 further comprising:

a reader module including a read sensor, the optical module, the reader module, and the writer module being physically separate such that no portion of the waveguide is interleaved with the reader module.

3. The EAMR head of claim 2 wherein the optical module resides between the reader module and the writer module.

4. The EAMR head of claim 1 wherein the angle is at least forty degrees and not more than fifty degrees.

5. The EAMR head of claim 1 wherein the NFT-facing surface is substantially parallel to the NFT.

6. The EAMR head of claim 5 wherein the NFT-facing surface extends not more than two hundred nanometers from the ABS.

7. The EAMR head of claim 6 wherein the NFT-facing surface extends at least twenty nanometers from the ABS.

8. The EAMR head of claim 5 wherein the NFT-facing surface extends not more than one hundred nanometers from the ABS.

9. The EAMR head of claim 1 wherein the write pole includes a nose and a flared region, the nose meeting the flared region at a flare point, the pole-tip portion including at least the nose region, the NFT facing surface meeting the sloped surface at a throat height, the throat height being the same as the flare point.

10. The EAMR head of claim 1 wherein the write pole includes a nose and a flared region, the nose meeting the flared region at a flare point, the flare point being at least twenty and not more than two hundred nanometers from the ABS.

11. The EAMR head of claim 1 wherein the waveguide is at least one of a tapered waveguide and a planar solid immersion mirror.

12. The EAMR head of claim 1 wherein the waveguide directs the energy in a direction substantially perpendicular to the ABS.

13. The EAMR head of claim 1 wherein the pole-tip portion includes a plurality of moments.

14. The EAMR head of claim 13 wherein the pole-tip portion includes a plurality of layers, each of the plurality of layers having a moment of the plurality of moments, a first layer being disposed at a leading edge of the write pole, the first layer including the NFT-facing surface and the sloped surface, the first layer having a highest moment of the plurality of moments.

15. The EAMR head of claim 14 wherein the pole-tip portion includes an opposing surface opposite to and wider than the NFT-facing surface.

16. The EAMR head of claim 1 wherein the media includes:
a magnetic layer;
a heat sink layer; and
a soft magnetic underlayer, the heat sink layer residing between the magnetic layer and the heat sink layer.

17. An energy assisted magnetic recording (EAMR) head coupled with a laser for providing energy and having an air-bearing surface (ABS) configured to reside in proximity to a media during use, the EAMR head comprising:
a reader module including a read sensor;
an optical module including a waveguide and a near field transducer (NFT) proximate to the ABS, the waveguide for directing the energy from the laser toward the ABS, the NFT being optically coupled with the waveguide and for focusing the energy onto the media; and
a writer module including a write pole and at least one coil, the optical module, the reader module, and the writer module being physically separate such that no portion of the waveguide is interleaved with the writer module and such that such that no portion of the waveguide is interleaved with the reader module, a write pole including a pole-tip portion for providing a magnetic field to the media and a yoke coupled to the pole-tip portion, the pole-tip portion including an ABS-facing surface, a sloped surface, a NFT-facing surface between the ABS-facing surface and the sloped surface, and an opposing surface opposite to the NFT-facing surface, the NFT-facing surface being substantially parallel to the NFT, the sloped surface being sloped at an angle of at least forty degrees and not more than fifty degrees with respect to the NFT-facing surface, the NFT-facing surface extending at least twenty nanometers and not more than one hundred fifty nanometers from the ABS, the pole-tip portion further includes a plurality of layers, each of the plurality of layers having a different moment that decreases with increasing distance from the NFT-facing surface, the opposing surface being wider than the NFT-facing surface.

18. An energy assisted magnetic recording (EAMR) disk drive comprising:
a media;
a slider;
a laser for providing energy;
an EAMR head coupled with the slider and receiving the energy, the EAMR head having an air-bearing surface (ABS) configured to reside in proximity to the media during use, the EAMR head including an optical module and a writer module, the optical module including a waveguide and a near field transducer (NFT) proximate to the ABS, the waveguide for directing the energy from the laser toward the ABS, the NFT being optically coupled with the waveguide and for focusing the energy onto the media, the writer module including a write pole and at least one coil, the optical module and the writer module being physically separate such that no portion of the waveguide is interleaved with a magnetic portion of the writer module, a write pole including a pole-tip portion for providing a magnetic field to the media and a yoke coupled to the pole-tip portion, the pole-tip portion including an ABS-facing surface, a sloped surface, and a NFT-facing surface between the ABS-facing surface and the sloped surface, the sloped surface being sloped at an angle of at least twenty-five degrees and not more than sixty-five degrees with respect to the NFT-facing surface.

19. The EAMR disk drive of claim 18 wherein the NFT-facing surface is substantially parallel to the NFT.

20. The EAMR disk drive of claim 18 wherein the media includes:
a magnetic layer;
a heat sink layer; and
a soft magnetic underlayer, the heat sink layer residing between the magnetic layer and the heat sink layer.

21. The EAMR disk drive of claim 18 wherein the EAMR head further includes:
a reader module including a read sensor, the optical module, the reader module, and the writer module being physically separate such that no portion of the waveguide is interleaved with the reader module.

22. The EAMR disk drive of claim 21 wherein the optical module resides between the reader module and the writer module.

23. The EAMR disk drive of claim 18 wherein the waveguide directs the energy in a direction substantially perpendicular to the ABS.

24. The EAMR disk drive of claim 18 wherein the pole-tip portion includes a plurality of moments.

25. The EAMR disk drive of claim 24 wherein the pole-tip portion includes a plurality of layers, each of the plurality of layers having a moment of the plurality of moments, a first layer being disposed at a leading edge of the write pole, the first layer including the NFT-facing surface and the sloped surface, the first layer having a highest moment of the plurality of moments.

26. The EAMR disk drive of claim 25 wherein the pole-tip portion includes a surface opposite to the NFT-facing surface and wider than the NFT-facing surface.

27. A method for providing an energy assisted magnetic recording (EAMR) head coupled with a laser for providing energy and having an air-bearing surface (ABS) configured to reside in proximity to a media during use, the method comprising:
    providing an optical module including a waveguide and a near field transducer (NFT) proximate to the ABS, the waveguide for directing the energy from the laser toward the ABS, the NFT being optically coupled with the waveguide and for focusing the energy onto the media; and
    providing a writer module including a write pole and at least one coil, the optical module and the writer module being physically separate such that no portion of the waveguide is interleaved with a magnetic portion of the writer module, a write pole including a pole-tip portion for providing a magnetic field to the media and a yoke coupled to the pole-tip portion, the pole-tip portion including an ABS-facing surface, a sloped surface, and a NFT-facing surface between the ABS-facing surface and the sloped surface, the sloped surface being sloped at an angle of at least twenty-five degrees and not more than sixty-five degrees with respect to the NFT-facing surface.

28. The method of claim 27 wherein the NFT-facing surface is substantially parallel to the NFT.

29. The method of claim 27 further comprising:
    providing a reader module including a read sensor, the optical module, the reader module, and the writer module being physically separate such that no portion of the waveguide is interleaved with the reader module.

30. The method of claim 29 wherein the step of providing the optical module further includes:
    fabricating the optical module between the reader module and the writer module.

31. The method of claim 27 wherein the angle is at least forty degrees and not more than fifty degrees.

32. The method of claim 27 wherein the step of providing the optical module further includes:
    providing the waveguide directing the energy in a direction substantially perpendicular to the ABS.

33. The method of claim 27 wherein the pole-tip portion includes a plurality of moments.

34. The method of claim 27 wherein the step of providing the writer module further includes:
    providing the pole-tip portion having an opposing surface opposite to the NFT-facing surface, the opposing surface being wider than the NFT-facing surface.

* * * * *